(12) United States Patent
Schwarz et al.

(10) Patent No.: US 11,719,169 B2
(45) Date of Patent: *Aug. 8, 2023

(54) GAS TURBINE ENGINE WITH HEAT EXCHANGER DIAGNOSTICS

(71) Applicant: Raytheon Technologies Corporation, Farmington, CT (US)

(72) Inventors: Frederick M. Schwarz, Glastonbury, CT (US); Nathan A. Snape, Tolland, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,587

(22) Filed: Apr. 14, 2022

(65) Prior Publication Data

US 2022/0243665 A1 Aug. 4, 2022

Related U.S. Application Data

(62) Division of application No. 15/271,274, filed on Sep. 21, 2016, now Pat. No. 11,346,288.

(51) Int. Cl.
| | |
|---|---|
| *F02C 9/18* | (2006.01) |
| *F02C 7/18* | (2006.01) |
| *G01M 15/09* | (2006.01) |
| *F02K 3/115* | (2006.01) |

(52) U.S. Cl.
CPC ............. *F02C 9/18* (2013.01); *F02C 7/185* (2013.01); *F02K 3/115* (2013.01); *G01M 15/09* (2013.01); *F05D 2260/213* (2013.01); *F05D 2260/80* (2013.01); *F05D 2270/053* (2013.01); *F05D 2270/112* (2013.01); *F05D 2270/301* (2013.01); *Y02T 50/60* (2013.01)

(58) Field of Classification Search
CPC .... F02C 9/18; F02C 9/00; F02C 9/16; G01M 15/09
See application file for complete search history.

(56) References Cited

U.S. PATENT DOCUMENTS

| | | | |
|---|---|---|---|
| 4,298,054 | A | 11/1981 | Adamowski |
| 5,739,755 | A | 4/1998 | Goldenberg |
| 6,817,408 | B2 | 11/2004 | Lines et al. |

(Continued)

FOREIGN PATENT DOCUMENTS

EP 2829706 A1 1/2015

OTHER PUBLICATIONS

European Search Report for European Application No. 17192458.2 dated Feb. 26, 2018.

*Primary Examiner* — Courtney D Heinle
*Assistant Examiner* — John S Hunter, Jr.
(74) *Attorney, Agent, or Firm* — Carlson, Gaskey & Olds, P.C.

(57) ABSTRACT

A gas turbine engine has a compressor section and a turbine section. A secondary cooling air includes a first fluid connection to tap cooling air and pass the cooling air through a plurality of tubes, and a second fluid connection for returning air from the tubes back to at least one of the compressor and turbine for cooling. A sensor senses a condition of the cooling air downstream of the tubes and a control compares the sensed condition of the cooling air to an expected condition, and to identify a potential concern in the cooling air system should the sensed condition differ from the expected condition by more than a predetermined amount.

18 Claims, 2 Drawing Sheets

(56) References Cited

U.S. PATENT DOCUMENTS

| | | |
|---|---|---|
| 7,857,036 B2 | 12/2010 | Bergqvist et al. |
| 8,261,527 B1 | 9/2012 | Stearns et al. |
| 8,747,055 B2 | 6/2014 | McCune et al. |
| 8,955,794 B2 | 2/2015 | Mackin et al. |
| 9,109,518 B2 | 8/2015 | Balestrino et al. |
| 2014/0000279 A1 | 1/2014 | Brousseau et al. |
| 2015/0247463 A1 | 9/2015 | DeFrancesco |

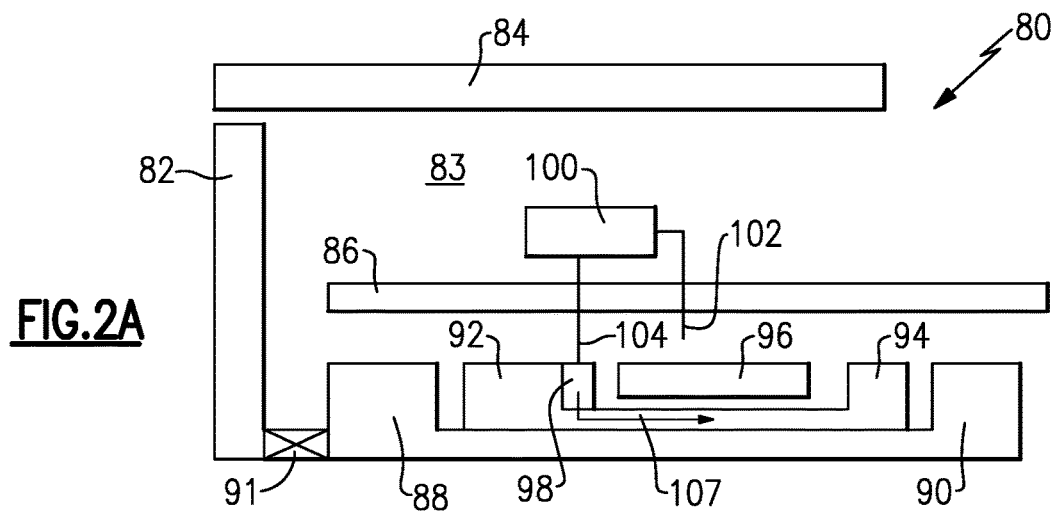
FIG.2A
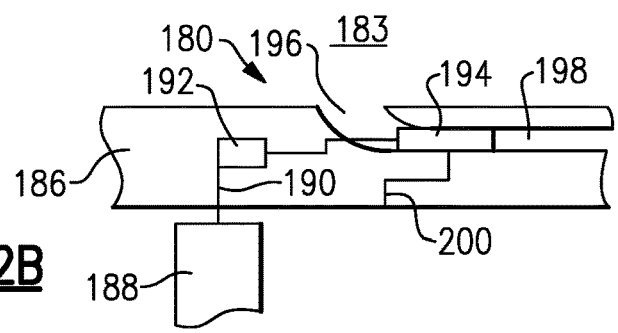
FIG.2B
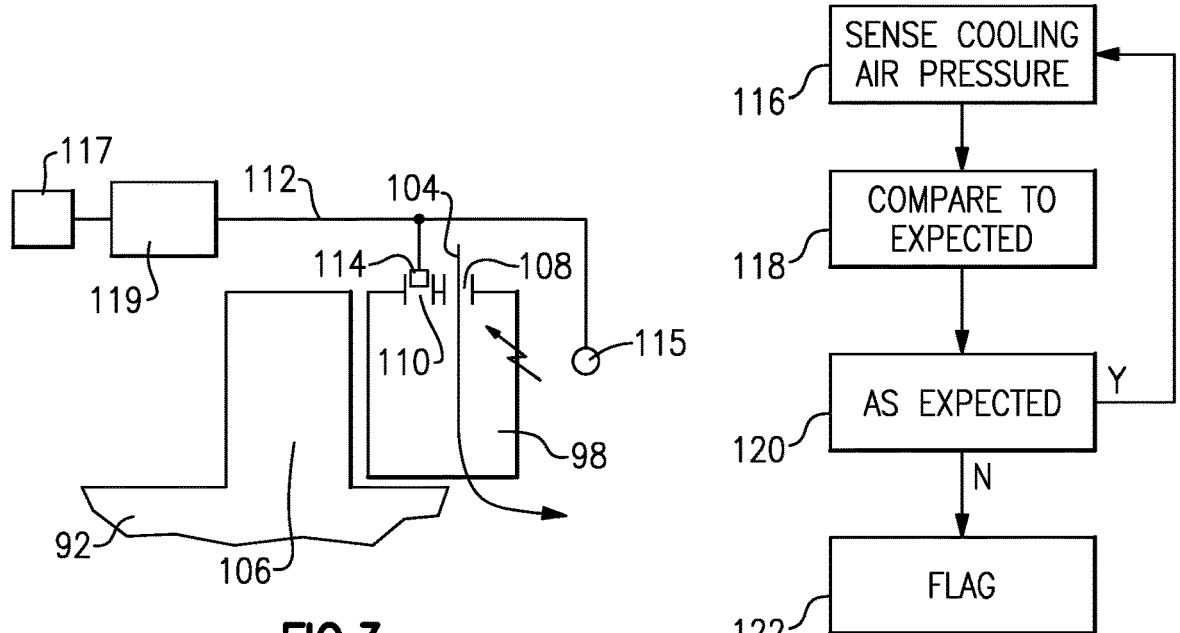
FIG.3
FIG.4

GAS TURBINE ENGINE WITH HEAT EXCHANGER DIAGNOSTICS

CROSS REFERENCE TO RELATED APPLICATION

This application is a continuation of U.S. patent application Ser. No. 15/271,274 filed on Sep. 21, 2016, now U.S. Pat. No. 11,346,288 granted on May 31, 2022.

BACKGROUND OF THE INVENTION

This application relates to a system for monitoring the operation of a heat exchanger providing cooling air in a gas turbine engine.

Gas turbine engines are known and typically include a fan delivering air into a bypass duct as propulsion and delivering air into a compressor as core engine air. The air is compressed and then delivered into a combustor where it is mixed with fuel and ignited. Products of this combustion pass downstream over turbine rotors driving them to rotate.

As known, the products of combustion are hot. Further, the compressor components can become hot, particularly, near downstream locations.

As such, cooling air is provided to components within the gas turbine engine.

Historically, the fan rotated at the same speed as a turbine rotor. This limited the design of the gas turbine engine as it would be desirable for the turbine rotor to rotate at faster speeds and the fan rotor to rotate at slower speeds. More recently, a gear reduction has been located between the turbine rotor and the fan rotor.

With the inclusion of the gear reduction, the temperatures experienced by the compressor and turbine sections has increased dramatically.

SUMMARY OF THE INVENTION

In a featured embodiment, a gas turbine engine has a compressor section and a turbine section. A secondary cooling air includes a first fluid connection to tap cooling air and pass the cooling air through a plurality of tubes, and a second fluid connection for returning air from the tubes back to at least one of the compressor and turbine for cooling. A sensor senses a condition of the cooling air downstream of the tubes and a control compares the sensed condition of the cooling air to an expected condition, and to identify a potential concern in the cooling air system should the sensed condition differ from the expected condition by more than a predetermined amount.

In another embodiment according to the previous embodiment, the condition is a pressure of the cooling air downstream of the tubes from a heat exchanger.

In another embodiment according to any of the previous embodiments, the first and second connections are fluid conduits.

In another embodiment according to any of the previous embodiments, the pressure is sensed downstream of the second fluid connection.

In another embodiment according to any of the previous embodiments, the cooling air is returned into a diffuser case downstream of the compressor section for transfer to at least one of the turbine and the compressor sections.

In another embodiment according to any of the previous embodiments, the sensor senses the pressure within a part of the diffuser case which is dedicated to passing cooling flow to at least one of the turbine and compressor sections.

In another embodiment according to any of the previous embodiments, the sensor is positioned on the diffuser.

In another embodiment according to any of the previous embodiments, a pressure tap taps pressure from within the diffuser to the sensor, which is remote from the diffuser.

In another embodiment according to any of the previous embodiments, the sensor is located to be line replaceable.

In another embodiment according to any of the previous embodiments, a reference pressure is also sensed and the sensed cooling air pressure is compared to the sensed reference pressure at the expected condition.

In another embodiment according to any of the previous embodiments, the reference pressure is a pressure sensed downstream of the compressor section.

In another embodiment according to any of the previous embodiments, the expected condition is an artificially determined reference pressure.

In another embodiment according to any of the previous embodiments, the comparison may result in varying levels of indicated maintenance.

In another embodiment according to any of the previous embodiments, if the comparison results in the sensed pressure differing from the expected pressure by a first amount, then routine maintenance may be indicated whereas if the sensed pressure differs from the expected pressure by a second greater amount, a step more than routine maintenance may be indicated.

In another embodiment according to any of the previous embodiments, the more drastic step may be a power reduction.

In another embodiment according to any of the previous embodiments, the condition is sensed downstream of the second fluid connection.

In another embodiment according to any of the previous embodiments, a reference condition is also sensed and the sensed cooling air condition is compared to the sensed reference condition as the expected condition.

In another embodiment according to any of the previous embodiments, the expected condition is an artificially determined reference condition.

In another featured embodiment, a method includes tapping compressed cooling air and passing the cooling air through a heat exchanger, and returning air from the heat exchanger back to at least one of a compressor and turbine in a gas turbine engine for cooling. A condition of the cooling air downstream of the heat exchanger is sensed and compared to an expected condition. A potential concern in the cooling air system is identified should the sensed condition differ from the expected condition by more than a predetermined amount.

In another embodiment according to the previous embodiment, the condition is a pressure of the cooling air downstream of the heat exchanger.

These and other features may be best understood from the following drawings and specification.

BRIEF DESCRIPTION OF THE DRAWINGS

FIG. 2A shows a first gas turbine engine arrangement.
FIG. 2B shows alternative locations.
FIG. 3 shows a detail.
FIG. 4 is a flowchart.

DETAILED DESCRIPTION

Figure 1:
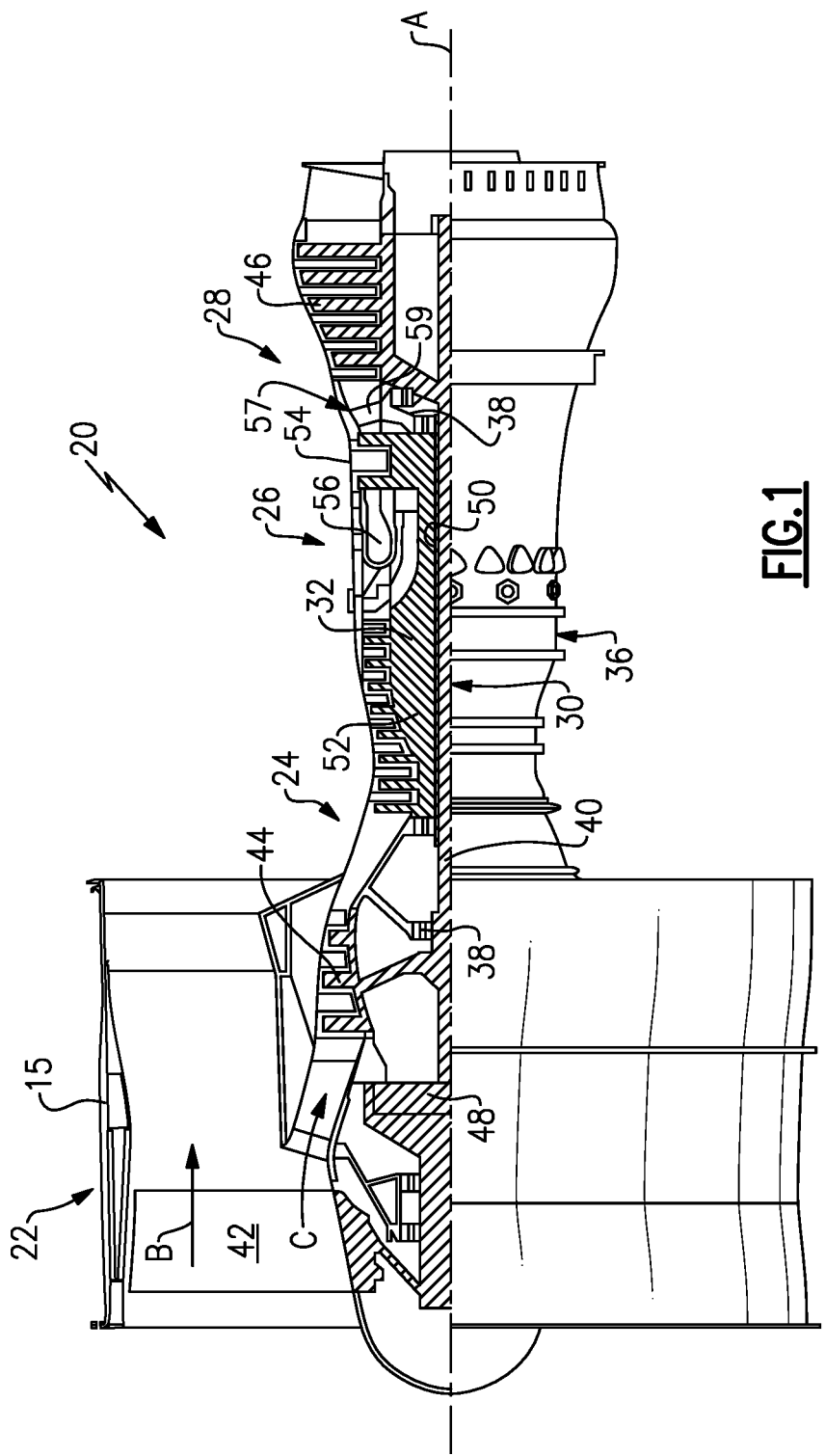
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7° R)]^{0.5}$. The "Low corrected fan tip speed" as disclosed herein according to one non-limiting embodiment is less than about 1150 ft/second (350.5 meters/second).

FIG. 2A shows an engine 80 incorporating a fan rotor 82 within a fan case 84. An intermediate engine case 86 surrounds a low pressure compressor 88 rotating with a low pressure turbine 90. A gear reduction 91 drives the fan rotor 82 through the turbine 90.

A high pressure compressor 92 rotates with a high pressure turbine 94. A combustor 96 is shown schematically. A diffuser 98 is positioned downstream of the high pressure compressor 92. A heat exchanger 100 is shown tapping high pressure air through conduit or tube 102. That air is cooled by bypass air in bypass duct 83 and is returned through conduit 104 to the diffuser 98. When the air is returned through conduit of tube 104, it passes through diffuser 98, optionally cooling downstream locations in the high pressure compressor 92 such as by diverting a portion of bypass air or other air that is cooler than the compressor discharge air in an upstream direction to a last stage of the high pressure compressor 92, and then passes as shown at 107 to the high pressure turbine 94 for cooling.

As mentioned above, the cooling loads on this air increase dramatically with recent developments in gas turbine engines.

FIG. 2B shows alternative engine 180. In engine 180, the intermediate case 186 is again positioned outwardly of a low pressure compressor 188. Tap includes a tube 190 and taps air for cooling from low pressure compressor 188, and through a boost compressor 192 to a heat exchanger 194. A scoop inlet 196 takes bypass air from bypass duct 183 and passes it over the heat exchanger 194 to an outlet 198. Air from tube 190, having been cooled in heat exchanger 194, passes through conduit 200 back into the engine for cooling such as shown in the FIG. 2A embodiment.

It should be understood that either location for the heat exchanger could be utilized in combination with either location for the tap for the cooling air. In addition, the cooling air could be tapped from upstream locations in the high pressure compressor 92.

The teachings of this disclosure could apply to any combination of tap location, return location, and heat exchanger location. With such an arrangement, monitoring the viability of the heat exchanger becomes important. Applicant has recognized that it would be undesirable for there to be a failure in the supply of cooling air, particularly, with modern high temperature engines.

Thus, FIG. 3 shows an arrangement wherein the diffuser 98, which is positioned downstream of the last stage 106 of the high pressure compressor 92, receives the cooling air through an inlet 108. The conduit 104 is shown connected to the opening 108. A tap 110 is shown to tap the pressure within the diffuser 98. The tap 110 will "see" the pressure delivered by the conduit 104 into the opening 108. The tap 110 includes a sensor 114 at some location, which is connected as shown at 112 to a control 119. The sensor 114 be located to be within the diffuser 98 or remote from the diffuser 98, but connected by a tube. The control 119 may be a stand-alone control or may be part of a full authority digital engine control (FADEC).

Another sensor 115 is illustrated and may sense a pressure, such as the discharge pressure downstream of the compressor 106. Other locations may also be sensed.

A designer may know that the pressure delivered to conduit 104, downstream of the heat exchanger 100 or 194, should approximate the pressure sensed by the sensor 115. If the two pressures are compared and differ by more than a predetermined amount, then a flag may be set as shown schematically at 117, which is indicative of a potential need for maintenance. Varying degrees of flags may be set. As an example, if the pressures are within 95 percent of each other, then maintenance may be set within a period of time. On the other hand, if the pressure sensed by sensor 114 is less than 90 percent of the pressure sensed by sensor 150, then indication may be set to flag that a power reduction of the engine is indicated. That is, with a greater difference, more drastic corrective steps may be indicated.

By sensing the pressure downstream of the heat exchanger 100 or 194, the system will be able to identify a failure in the heat exchanger 100 or 194, or any of the conduits 102/104/190/200. As such, the system ensures proper operation of the cooling air system and the supply of cooling air to the components requiring cooling. The heat exchanger could be any number of configurations, including a plurality of tubes for containing the cooling air.

As known, the diffuser typically includes a plurality of circumferentially spaced vanes and the air passes through these circumferentially spaced vanes. There may be a plurality of sensors in a plurality of these vanes to provide redundant information.

While a particular comparison is disclosed, it should be understood that the pressure sensed by sensor 114 could instead simply be compared to some preset or predetermined limit. This preset or predetermined limit could be based upon engine operating conditions. In addition, while a particular location is shown for sensor 115, other locations could be utilized which may be at other pressures. As an example, the reference pressure could come from a more intermediate location in the compressor with the pressure sensed by sensor 114 being expected to be higher than the referenced pressure by a predetermined amount.

Broadly speaking, a system could be said to include a gas turbine engine with a compressor section and a turbine section. A cooling air system includes a fluid connection to tap air 102/190 and pass the cooling air through a heat exchanger 100/194. A fluid connection returns air from the heat exchanger back to at least one of the compressor and turbine for cooling. A sensor 114 senses a condition of the cooling air downstream of the heat exchanger and compares the condition of the cooling air to an expected condition. A control identifies a potential concern in the cooling air system should the sensed condition differ from the expected by more than a predetermined amount.

A flowchart is shown in FIG. 4. At step 116, a cooling air pressure is sensed. At step 118, it is compared to an expected pressure. As explained above, this expected pressure may be a preset limit, or a limit determined artificially or may be a sensed reference pressure elsewhere in the engine.

If the sensed cooling air pressure compares to the expected closely (step 120), then the method returns to step 116. On the other hand, if the two pressures are different, or not as expected, then a flag 122 is set.

While a pressure is sensed, other conditions, such as temperature of the cooling air may be sensed as indicative of the condition of the cooling air system and, in particular, the heat exchanger and its plumbing connections.

In the location illustrated in FIG. 3, the sensor 114 is "line replaceable." That means it can be replaced without disassembly of the compressor module. This is a beneficial location, as requiring disassembly of a compressor module would make replacement of the sensor an expensive step.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. The method comprising:
    tapping compressed cooling air from a compressor section in a gas turbine engine and passing the cooling air through a first fluid connection to a heat exchanger, and returning air from the heat exchanger through a second fluid connection back to at least one of the compressor section and a turbine section in the gas turbine engine for cooling;
    sensing a sensed condition of the returning air downstream of the heat exchanger and comparing the sensed condition of the returning air to an expected condition in a control;
    identifying a potential concern in a cooling air system should the sensed condition differ from the expected condition by more than a predetermined amount; and
    the sensed condition being indicative of a failure in at least one of the heat exchanger, the first fluid connection, or the second fluid connection, and the control setting a maintenance flag such that when the returning air is not properly passing to the at least one of the compressor section and the turbine section the maintenance flag is set.

2. The method as set forth in claim 1, wherein the sensed condition is an actual pressure of the cooling air downstream of the heat exchanger.

3. The method as set forth in claim 2, wherein the actual pressure is sensed downstream of the second fluid connection.

4. The method as set forth in claim 3, wherein the returning air is returned into a diffuser downstream of the compressor section for transfer to the at least one of the turbine section and the compressor section.

5. The method as set forth in claim 4, wherein the actual pressure is sensed within a part of the diffuser which is connected to pass the returning air to the at least one of the turbine section and the compressor section.

6. The method as set forth in claim 5, wherein the returning air from within said diffuser is tapped to a first sensor, the first sensor being remote from the diffuser.

7. The method as set forth in claim 5, wherein a reference pressure is also sensed and the actual pressure is compared to the reference pressure as said expected condition.

8. The method as set forth in claim 7, wherein the reference pressure is a pressure sensed downstream of the compressor section.

9. The method as set forth in claim 5, wherein the expected condition is an artificially determined reference pressure.

10. The method as set forth in claim 2, wherein the control is programmed such that the comparison results in varying levels of the maintenance flag.

11. The method as set forth in claim 10, wherein if the comparison results in the sensed condition differing from the expected condition by a first amount, then routine maintenance is indicated whereas if the sensed condition differs from the expected condition by a second greater amount, then a power reduction of the gas turbine engine is commanded by the control.

12. The method as set forth in claim 2, wherein the returning air is returned into a diffuser downstream of the compressor section for transfer to the at least one of the turbine section and the compressor section.

13. The method as set forth in claim 2, wherein a reference pressure is also sensed and the actual pressure is compared to the reference pressure as the expected condition.

14. The method as set forth in claim 13, wherein the reference pressure is a pressure sensed downstream of the compressor section.

15. The method as set forth in claim 1, wherein the control is programmed such that the comparison results in varying levels of the maintenance flag.

16. The method as set forth in claim 15, wherein if the comparison results in the sensed condition differing from said expected condition by a first amount, then routine maintenance is indicated whereas if the sensed condition differs from the expected condition by a second greater amount, then a power reduction of the gas turbine engine is commanded by the control.

17. The method as set forth in claim 1, wherein the expected condition is an artificially determined reference pressure.

18. The method as set forth in claim 1, wherein if the sensed condition differs from the expected condition by a sufficient amount then a power reduction of the gas turbine engine is commanded by the control.

\* \* \* \* \*